(12) United States Patent
Sprafke et al.

(10) Patent No.: US 11,895,380 B2
(45) Date of Patent: Feb. 6, 2024

(54) CRYOGENIC COLD LINK FOR MULTIPLE COOLERS

(71) Applicant: Raytheon Company, Waltham, MA (US)

(72) Inventors: Thomas P. Sprafke, Goleta, CA (US); Stephen Marinsek, Albuquerque, NM (US)

(73) Assignee: Raytheon Company, Tewksbury, MA (US)

( * ) Notice: Subject to any disclaimer, the term of this patent is extended or adjusted under 35 U.S.C. 154(b) by 780 days.

(21) Appl. No.: 17/068,771

(22) Filed: Oct. 12, 2020

(65) Prior Publication Data

US 2022/0116525 A1  Apr. 14, 2022

(51) Int. Cl.
*F28D 21/00* (2006.01)
*H04N 23/52* (2023.01)
*F28D 19/00* (2006.01)

(52) U.S. Cl.
CPC ............. *H04N 23/52* (2023.01); *F28D 19/00* (2013.01); *F28D 2021/0029* (2013.01)

(58) Field of Classification Search
CPC ....... F25D 19/006; H04N 23/52; F28D 19/00; F28D 2021/0029
See application file for complete search history.

(56) References Cited

U.S. PATENT DOCUMENTS

| | | | |
|---|---|---|---|
| 6,347,522 B1 | 2/2002 | Maguire et al. | |
| 6,629,418 B1 | 10/2003 | Gao et al. | |
| 6,675,600 B1* | 1/2004 | Robillard | G01J 5/061 |
| | | | 438/73 |
| 7,111,669 B2 | 9/2006 | Hoglinger et al. | |
| 7,371,134 B2 | 5/2008 | Winn | |
| 10,107,543 B2 | 10/2018 | Pourrahimi et al. | |
| 2004/0031593 A1* | 2/2004 | Ernst | F28D 15/0275 |
| | | | 165/104.21 |
| 2021/0310770 A1* | 10/2021 | Beck | F41H 5/0485 |

* cited by examiner

*Primary Examiner* — Dani Fox (57) ABSTRACT

A device includes a substantially planar platform. The device also includes a detector connected to the platform. The device further includes multiple cold fingers including a first cold finger and a second cold finger. Each cold finger has an end portion connected to the platform. Each cold finger is configured to be fluidly coupled to a corresponding cryocooler. Each cold finger is configured to absorb thermal energy generated by the detector. The second cold finger has a flexure region at the end portion.

20 Claims, 6 Drawing Sheets

CRYOGENIC COLD LINK FOR MULTIPLE COOLERS

TECHNICAL FIELD

This disclosure is generally directed to cryogenic cooling systems. More specifically, this disclosure is directed to a cryogenic cold link for use with multiple coolers.

BACKGROUND

Large imaging detectors with higher resolutions and/or more complex read out integrated circuits (ROICs) are becoming more common in infrared cameras. The larger formats and new ROICs generally produce more heat around the imaging detectors, which need to be held at cryogenic temperatures. To maintain the imaging detectors at the required temperatures, more cooling power is needed to extract heat that is generated.

SUMMARY

This disclosure relates to a cryogenic cold link for use with multiple coolers.

In a first embodiment, a device includes a substantially planar platform. The device also includes a detector connected to the platform. The device further includes multiple cold fingers including a first cold finger and a second cold finger. Each cold finger has an end portion connected to the platform. Each cold finger is configured to be fluidly coupled to a corresponding cryocooler. Each cold finger is configured to absorb thermal energy generated by the detector. The second cold finger has a flexure region at the end portion.

In a second embodiment, a system includes a substantially planar platform. The system also includes a detector connected to the platform. The system further includes multiple cold fingers including a first cold finger and a second cold finger. Each cold finger has an end portion connected to the platform. Each cold finger is configured to absorb thermal energy generated by the detector. The second cold finger has a flexure region at the end portion. In addition, the system includes multiple cryocoolers including a first cryocooler and a second cryocooler. The first cryocooler is fluidly coupled to the first cold finger, and the second cryocooler is fluidly coupled to the second cold finger.

In a third embodiment, a method includes generating thermal energy at a detector connected to a substantially planar platform. The method also includes transmitting the thermal energy through the platform and into multiple cold fingers including a first cold finger and a second cold finger. Each cold finger has an end portion connected to the platform. The method further includes operating multiple cryocoolers, including a first cryocooler and a second cryocooler, to cool the multiple cold fingers. The first cryocooler is fluidly coupled to the first cold finger, and the second cryocooler is fluidly coupled to the second cold finger. In addition, the method includes flexing the second cold finger at a flexure region disposed at the end portion of the second cold finger.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity, and is not meant to imply that the feature or component cannot be employed in the embodiments described in connection with that figure.

As noted above, large imaging detectors with higher resolutions and/or more complex read out integrated circuits (ROICs) are becoming more common in infrared cameras. The larger formats and new ROICs generally produce more heat around the imaging detectors, which need to be held at cryogenic temperatures. To maintain the imaging detectors at the required temperatures, more cooling power is needed to extract heat that is generated. Higher heat loads are sometimes addressed by using larger-capacity cryogenic coolers. However, this approach can often be problematic because the size, weight, and input power of the coolers quickly increases with their cooling power capabilities, which often presents challenges in real-world implementations. Other systems use multiple cryocoolers to provide the necessary cooling. However, these systems rely on cold link switches or "cryo-switches" to switch between different cryocoolers during operation, and these switches are inefficient and unnecessarily complicate the overall system.

To address these or other issues, this disclosure provides various systems and methods that enable multiple cryogenic coolers to be thermally combined to increase performance. The disclosed systems and methods do not require the use of cryo-switches. Embodiments of this disclosure may be used in a variety of applications, such as in aerial vehicles or other systems where space and weight limits for cooling systems are limited. It will be understood that embodiments of this disclosure may include any one, more than one, or all of the features described here. In addition, embodiments of this disclosure may additionally or alternatively include other features not described here.

Figure 1:
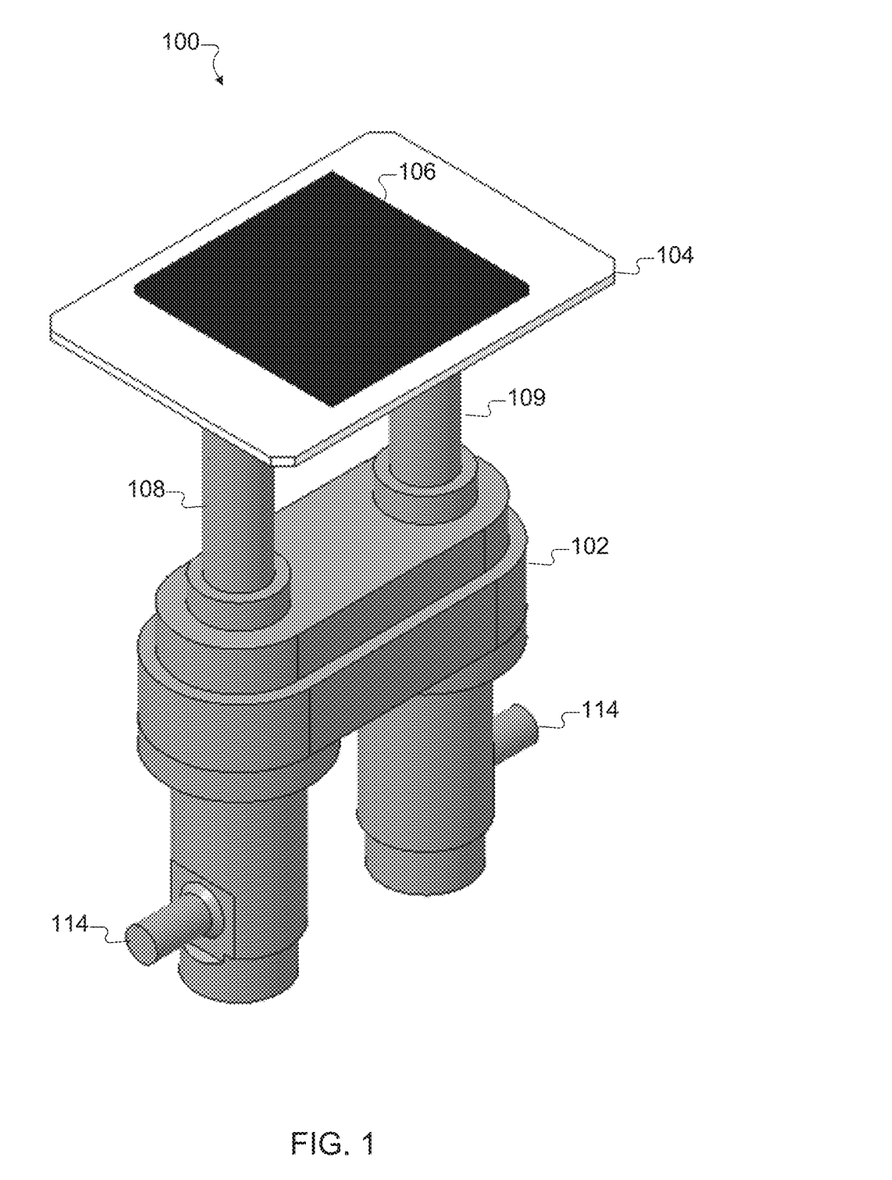
FIGS. 1 and 2 illustrate different views of an example cold link for use with multiple cryogenic coolers according to this disclosure.
Figure 2:
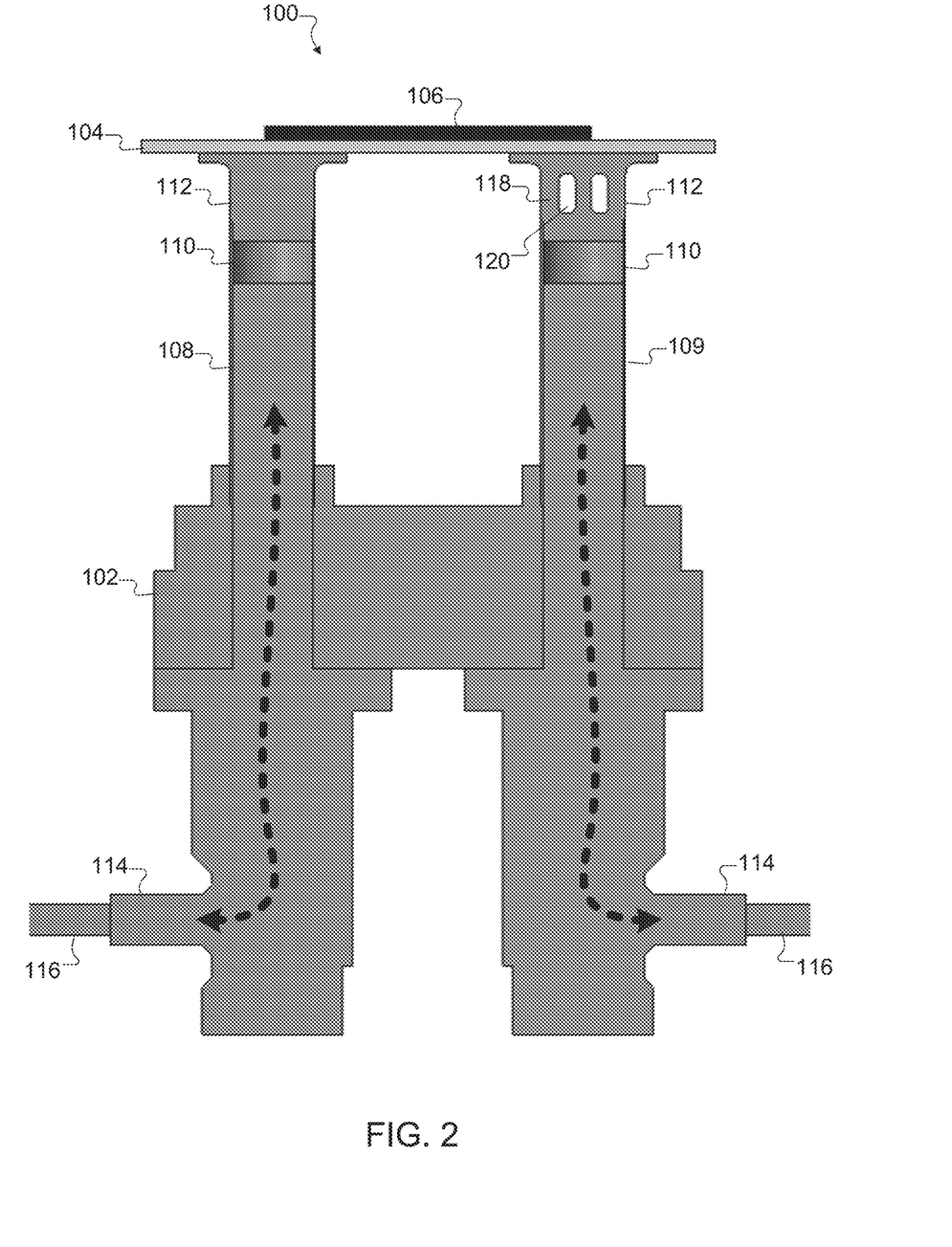

FIGS. 1 and 2 illustrate different views of an example cold link 100 for use with multiple cryogenic coolers according to this disclosure. In particular, FIG. 1 illustrates an isometric view of the cold link 100 and FIG. 2 illustrates a cross-sectional view of the cold link 100 through the middle of the cold link 100 along the longer dimension of the cold link 100.

As shown in FIGS. 1 and 2, the cold link 100 includes a housing 102. The housing 102 surrounds multiple components that are used for cooling, such as coolant, coolant chambers, and the like. The housing 102 may be formed from any suitable material or materials, such as one or more metals or metal alloys. As particular examples, the housing 102 may be formed from a nickel-iron alloy, INVAR, or titanium. The housing 102 may also be formed in any suitable manner, such as machining, molding, welding, or additive manufacturing.

A platform 104 is connected to one end of the housing 102. The platform 104 is substantially planar and provides a supportive substrate for a detector 106. The platform 104 may be formed from any suitable material or materials. As particular examples, the platform 104 may be formed from one or more ceramic materials, such as alumina or aluminum nitride. The platform 104 may also be formed in any suitable manner.

The detector 106 is attached to a substantially flat surface of the platform 104. The detector 106 generally includes a sensor array configured to capture imaging data (such as visible or infrared measurements) or other measurements. The detector 106 may also include at least one ROIC used to provide measurements from the detector 106 to one or more external components. The detector 106 may optionally include other elements, such as one or more optical elements like one or more lenses. One or more components of the detector 106 (e.g., the ROIC) generates thermal energy or heat over time while in operation. To avoid damaging thermal build-up, ensure safe operation, and achieve improved or optimal performance, the cold link 100 is configured to cool the platform 104 and the detector 106 by transferring thermal energy away from the platform 104 and the detector 106.

To provide cooling to the platform 104 and the detector 106, the cold link 100 includes multiple cold fingers 108-109 that extend from one end of the housing 102. As shown in FIG. 2, one end of each of the cold fingers 108-109 is connected to a surface of the platform 104. In the embodiment shown here, the surface of the platform 104 to which the cold fingers 108-109 are connected is opposite the surface of the platform 104 to which the detector 106 is connected. In other embodiments, the cold fingers 108-109 may be connected to the same surface of the platform 104 as the detector 106.

Within the cold fingers 108-109 are displacers 110 that move longitudinally back and forth, causing coolant inside the cold finger 108-109 to compress and expand during a cooling cycle. This operation causes end portions 112 of the cold fingers 108-109 to become very cold. The end portions 112 may represent substantially-solid (not hollow) portions of the cold finger 108-109 that extend beyond a hollow chamber in which the displacers 110 move. When cold, the end portions 112 absorb thermal energy generated by the detector 106 via conductive heat transfer through the platform 104. Each displacer 110 operates in conjunction with a corresponding cryocooler, which are described below. Each cold finger 108-109 is fluidly coupled to its corresponding cryocooler via a coolant port 114 and a transfer line 116 as indicated by the dashed arrows in FIG. 2.

Like the housing 102, the cold fingers 108-109 may be formed from any suitable material or materials, such as one or more metals or metal alloys. As particular examples, the cold fingers 108-109 may be formed from a nickel-iron alloy, INVAR, titanium, or INCONEL. The cold fingers 108-109 may also be formed in any suitable manner, such as machining, molding, welding, or additive manufacturing.

The material(s) forming the cold fingers 108-109 can be different from the material(s) forming the platform 104. Different materials can have different coefficients of thermal expansion (CTEs). Thus, for example, a ceramic platform 104 would have a different CTE than metallic cold fingers 108-109, such as when the cold fingers 108-109 have a lower CTE than the platform 104. If the platform 104 and the cold fingers 108-109 were all very rigid and inflexibly connected to each other, such an assembly would suffer from large thermal stresses due to different levels of expansion and contraction resulting from heat transfer within these components. This may ultimately cause one or more of the components (such as the platform 104 or one of the cold fingers 108-109) to fracture or otherwise fail.

To mitigate thermal stresses in the cold link 100 caused by different CTEs, the end portion 112 of the cold finger 109 includes a flexure region 118 as shown in FIG. 2. The flexure region 118 provides a greater degree of compliance within the cold finger 109 as compared to the cold finger 108. That is, the flexure region 118 allows the end portion 112 of the cold finger 109 to flex (bend) in a direction parallel to the plane of the platform 104. Thus, when the platform 104 expands or contracts at a rate that is different than that of the cold finger 109, the cold finger 109 can flex to minimize stresses where the platform 104 connects to the cold finger 109. In some embodiments, the cold finger 108 may not include a flexure region 118 and be robust and comparatively inflexible, thereby acting like an anchor for the platform 104 and ensuring a stable location for the detector 106.

As shown in FIG. 2, this implementation of the flexure region 118 includes multiple voids 120 in the end portion 112 of the cold finger 109. In FIG. 2, the voids 120 are openings that pass through the end portion 112. In some embodiments, the voids 120 are elongated and oriented such that a long dimension of each void 120 is substantially perpendicular to the platform 104. The voids 120 reduce the quantity of material forming the end portion 112 of the cold finger 109, thereby making the overall end portion 112 more flexible. While two voids 120 are shown in FIG. 2, other numbers of voids 120 may be used here. Also, each void 120 may have any suitable form, and the voids 120 may or may not all have the same form.

Figure 3:
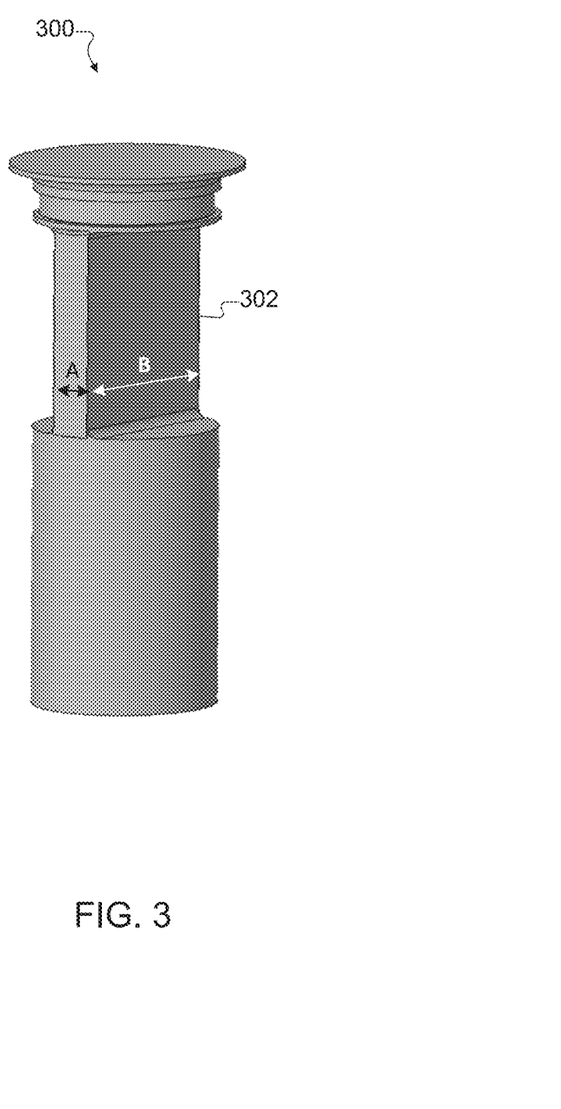
FIG. 3 illustrates an example cold finger with a different type of flexure region according to this disclosure.

FIG. 3 illustrates an example cold finger 300 with a different type of flexure region according to this disclosure. The cold finger 300 may represent or be represented by the cold finger 109 of FIGS. 1 and 2. As shown in FIG. 3, this embodiment of the cold finger 300 includes a flexure region 302 that is formed as a blade. The flexure region 302 is much narrower in one dimension (indicated by dimension "A") than in another dimension (indicated by dimension "B"). This enables the flexure region 302 to flex in the "A" direction in response to expansions or contractions of the platform to which the cold finger 300 is connected (such as the platform 104).

Although FIGS. 1 and 2 illustrate one example of a cold link 100 for use with multiple cryogenic coolers and FIG. 3 illustrates one example of a cold finger 300 for use in the cold link 100, various changes may be made to FIGS. 1 through 3. For example, some components shown in FIGS. 1 through 3 may be removed or arranged in other configurations, and additional components may be added. As a particular example, the cold link 100 may include more than two cold fingers. As another example, the flexure regions 118 and 302 may have a different shape. In general, cold links come in a wide variety of configurations, and FIGS. 1 through 3 do not limit this disclosure to any particular configuration of cold link.

Figure 4:
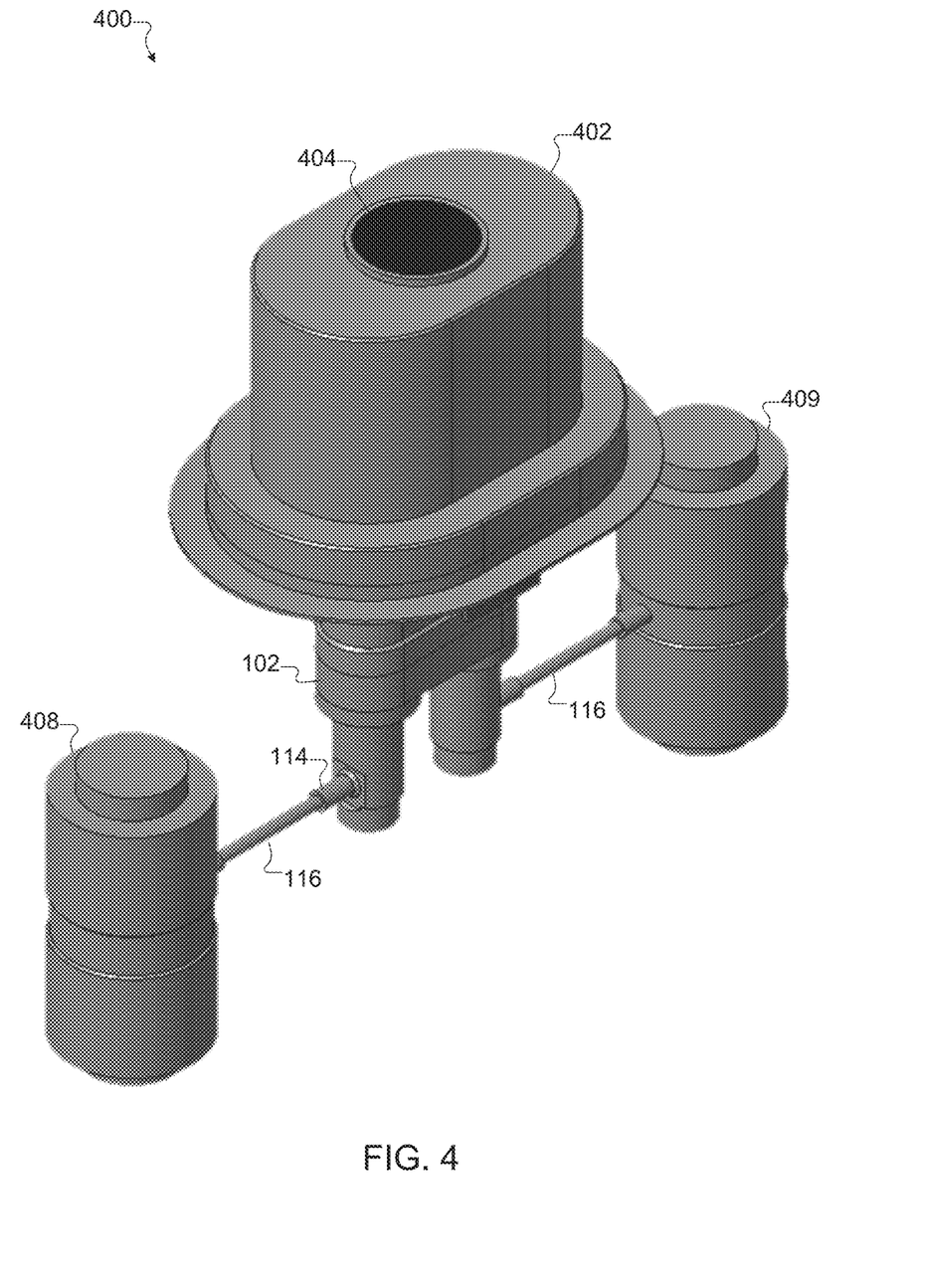
FIGS. 4 and 5 illustrate different views of an example system that uses multiple cryogenic coolers according to this disclosure.
Figure 5:
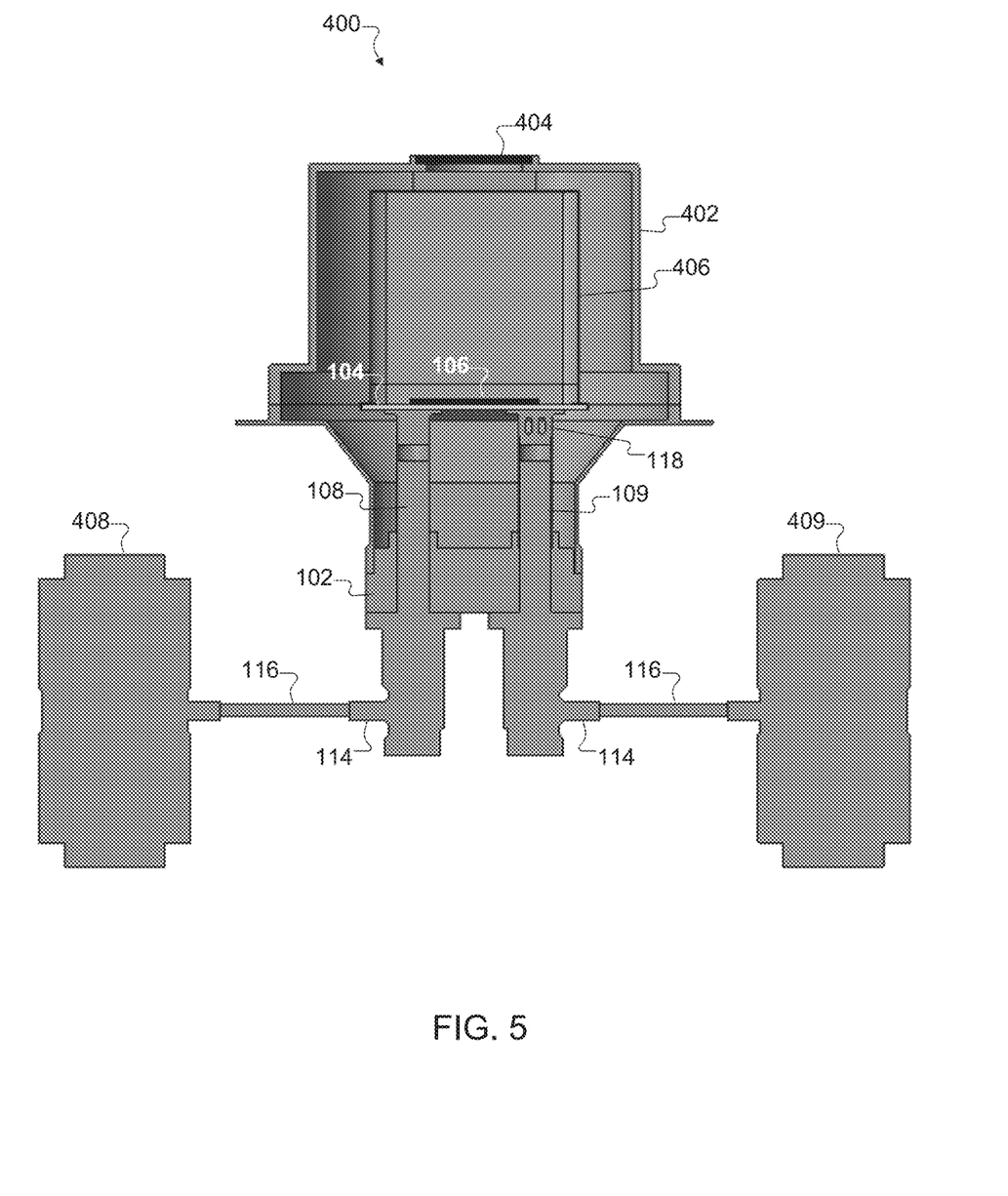

FIGS. 4 and 5 illustrate different views of an example system 400 that uses multiple cryogenic coolers according to this disclosure. In particular, FIG. 4 illustrates an isometric view of the system 400 and FIG. 5 illustrates a cross-sectional view of the system 400 through the middle of the system 400 along the longer dimension of the system 400.

As shown in FIGS. 4 and 5, the system 400 includes multiple components forming the cold link 100 of FIGS. 1 and 2. For example, the system 400 includes a housing 102, a platform 104, a detector 106, and cold fingers 108-109. Note that while the cold finger 109 here uses voids 120 to form a flexure region 118, the cold finger 109 may use any other suitable approach to form a flexure region (such as the flexure region 302).

The system 400 also includes a dewar housing 402. The dewar housing 402 extends from the housing 102 and forms a cavity around the platform 104 and the detector 106. In some embodiments, the cavity may be sealed and evacuated such that a vacuum or partial vacuum exists within the cavity. The dewar housing 402 also shields the detector 106 from radiation, particles, and other conditions that may exist outside the dewar housing 402. The dewar housing 402 may be formed from any suitable material or materials, such as one or more metals or metal alloys. As particular examples, the dewar housing 402 may be formed from titanium. The dewar housing 402 may also be formed in any suitable manner, such as machining, molding, welding, or additive manufacturing.

At the end of the dewar housing 402 opposite the detector 106 is an aperture 404 that limits the amount of radiation (such as visible or infrared radiation) into the cavity of the dewar housing 402. Within the dewar housing 402 is a cold shield 406 that is connected to the platform 104 and shields the detector 106 from ambient temperatures. There may also be various other components with the cavity of the dewar housing 402. For instance, one or more spectral filters, lenses, prisms, baffles, or other optical components may be positioned inside the cavity of the dewar housing 402.

The system 400 also includes multiple cryocoolers 408-409. Each cryocooler 408-409 is fluidly coupled to a corresponding cold finger 108-109 via the corresponding coolant port 114 and transfer line 116. In some embodiments, the cryocoolers 408-409 are linear or rotary micro-coolers that have a small form factor. For example, in some embodiments, each of the cryocoolers 408-409 is about one inch (about 2.54 cm) in diameter and about two inches (about 5.04 cm) long. Note, however, that each cryocooler 408-409 may be implemented in any other suitable manner. The cryocoolers 408-409 are collectively able to remove adequate thermal energy from the platform 104 and the detector 106. For example, in some embodiments, each of the cryocoolers 408-409 is capable of performing approximately 700-800 mW of heat lift, and the system 400 may require about 1500 mW of cooling. Thus, operation of the cryocoolers 408-409 together is sufficient to handle the cooling load. This is important because there is often a very small space that the system 400 is required to fit within, and larger more-powerful coolers will not fit in such a space. For instance, in some implementations, one cryocooler having the cooling power of the two cryocoolers 408-409 may have an overall size that is larger than the combined size of the two cryocoolers 408-409. Also, the power required to operate the two cryocoolers 408-409 can be less than the power required to operate one larger cryocooler with the same cooling capability.

The vacuum or partial vacuum within the dewar housing 402 enables high efficiency and high cooling performance of the cold fingers 108-109. Because both cold fingers 108-109 are attached to the common platform 104, the overall cooling capacity of the system 400 is higher than if the system 400 included only one cold finger 108-109. Of course, depending on the required cooling load, it may not be necessary to operate both cold fingers 108-109 simultaneously. That is, during some operations that generate less heat, it may be sufficient to operate only one of the cold fingers 108-109 to provide adequate cooling. This further reduces the overall power required to operate the system 400.

Although FIGS. 4 and 5 illustrate one example of a system 400 that uses multiple cryogenic coolers, various changes may be made to FIGS. 4 and 5. For example, some components shown in FIGS. 4 and 5 may be removed or arranged in other configurations, and additional components may be added. As a particular example, the transfer lines 116 are shown as straight in FIGS. 4 and 5. However, the transfer lines 116 can be bent to allow the cryocoolers 408-409 to be positioned closer to the housing 102, thus reducing the overall assembly size of the system 400. In general, cryogenically cooled systems come in a wide variety of configurations, and FIGS. 4 and 5 do not limit this disclosure to any particular configuration. Also, while two cryocoolers 408-409 are shown here, more than two cryocoolers may be used, such as with more than two cold fingers of the cold link 100. In addition, while FIGS. 4 and 5 illustrate one example operational environment in which multiple cryogenic coolers can be used, this functionality may be used in any other suitable system.

Figure 6:
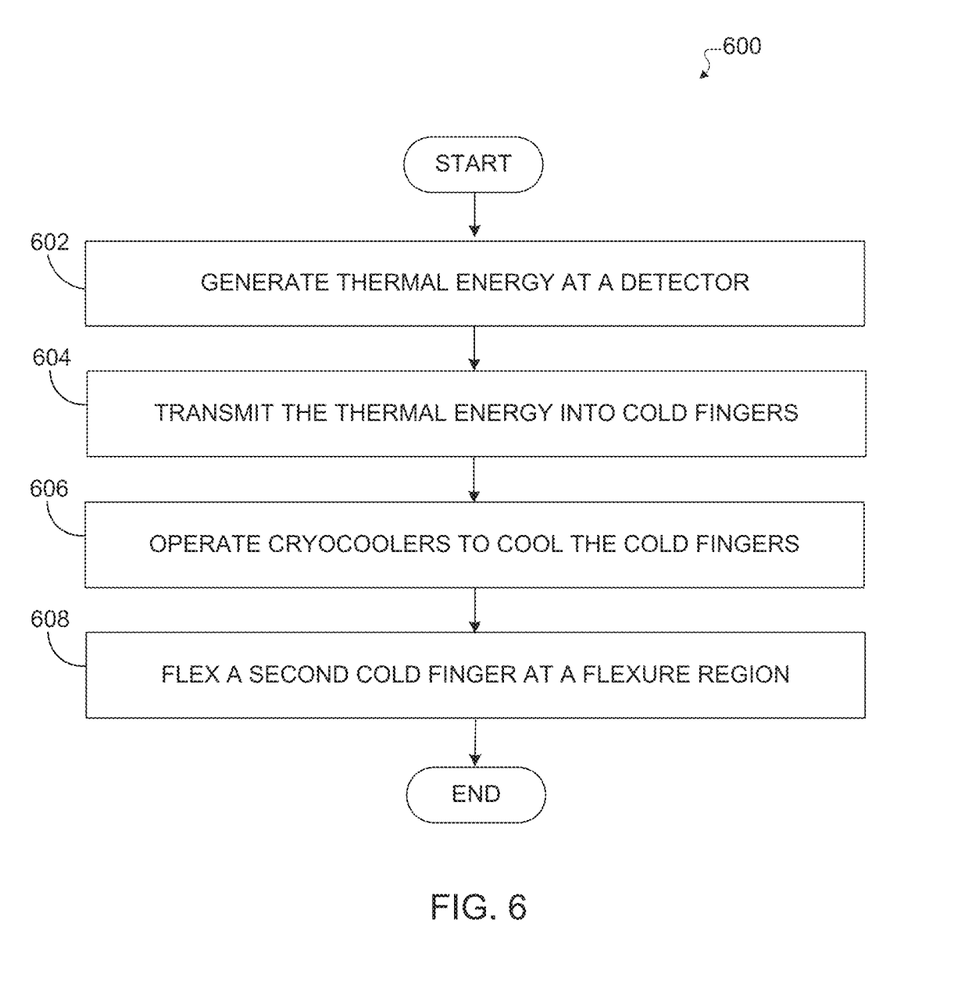
FIG. 6 illustrates an example method for operating a cooling system according to this disclosure.

FIG. 6 illustrates an example method 600 for operating a cooling system according to this disclosure. For ease of explanation, the method 600 is described as using the system 400 shown in FIGS. 4 and 5, although the method 600 may be used with any other suitable system.

At step 602, thermal energy is generated at a detector connected to a substantially planar platform. This may include, for example, the detector 106, which is connected to the platform 104, generating thermal energy while operating. At step 604, the thermal energy is transmitted through the platform and into multiple cold fingers including a first cold finger and a second cold finger, where each cold finger has an end portion connected to the platform. This may include, for example, the thermal energy generated by the detector 106 being conducted through the platform 104 and into the cold fingers 108-109. In some embodiments, the platform 104 has a different CTE than the cold fingers 108-109.

At step 606, multiple cryocoolers, including a first cryocooler and a second cryocooler, are operated to cool the multiple cold fingers. This may include, for example, the cryocoolers 408-409 operating to cool the cold fingers 108-109. The first cryocooler is fluidly coupled to the first cold finger, and the second cryocooler is fluidly coupled to the second cold finger. At step 608, the second cold finger flexes at a flexure region disposed at the end portion of the second cold finger. This may include, for example, the cold finger 109 flexing at the flexure region 118, 302. In some embodiments, the flexure region includes openings that pass through the second cold finger, a blade that is narrower in one dimension than in another dimension, or a combination of these.

Although FIG. 6 illustrates one example of a method 600 for operating a cooling system, various changes may be made to FIG. 6. For example, while shown as a series of steps, various steps shown in FIG. 6 may overlap, occur in parallel, occur in a different order, or occur multiple times. Moreover, some steps may be combined or removed and additional steps may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device comprising:
a substantially planar platform;
a detector connected to the platform; and
multiple cold fingers including a first cold finger and a second cold finger, each cold finger having an end portion connected to the platform, each cold finger configured to be fluidly coupled to a corresponding cryocooler, each cold finger configured to absorb thermal energy generated by the detector, the second cold finger having a flexure region at the end portion.

2. The device of claim 1, wherein the platform has a different coefficient of thermal expansion than any of the cold fingers.

3. The device of claim 1, wherein the platform comprises a ceramic material.

4. The device of claim 1, wherein the cold fingers comprise a metal alloy.

5. The device of claim 1, wherein the flexure region comprises openings that pass through the second cold finger.

6. The device of claim 5, wherein a long dimension of the openings is substantially perpendicular to the platform.

7. The device of claim 1, wherein the flexure region comprises a blade that is narrower in one dimension than in another dimension.

8. The device of claim 1, wherein:
the detector is connected to a first surface of the platform; and
the end portion of each cold finger is connected to a second surface of the platform opposite the first surface.

9. A system comprising:
a substantially planar platform;
a detector connected to the platform;
multiple cold fingers including a first cold finger and a second cold finger, each cold finger having an end portion connected to the platform, each cold finger configured to absorb thermal energy generated by the detector, the second cold finger having a flexure region at the end portion; and
multiple cryocoolers including a first cryocooler and a second cryocooler, the first cryocooler fluidly coupled to the first cold finger, the second cryocooler fluidly coupled to the second cold finger.

10. The system of claim 9, wherein the platform has a different coefficient of thermal expansion than any of the cold fingers.

11. The system of claim 9, wherein the platform comprises a ceramic material.

12. The system of claim 9, wherein the cold fingers comprise a metal alloy.

13. The system of claim 9, wherein the flexure region comprises openings that pass through the second cold finger.

14. The system of claim 13, wherein a long dimension of the openings is substantially perpendicular to the platform.

15. The system of claim 9, wherein the flexure region comprises a blade that is narrower in one dimension than in another dimension.

16. The system of claim 9, wherein:
the detector is connected to a first surface of the platform; and
the end portion of each cold finger is connected to a second surface of the platform opposite the first surface.

17. The system of claim 9, further comprising:
a dewar housing disposed over the platform and the detector, the dewar housing configured to shield the detector from conditions outside the dewar housing.

18. A method comprising:
generating thermal energy at a detector connected to a substantially planar platform;
transmitting the thermal energy through the platform and into multiple cold fingers including a first cold finger and a second cold finger, each cold finger having an end portion connected to the platform;
operating multiple cryocoolers, including a first cryocooler and a second cryocooler, to cool the multiple cold fingers, the first cryocooler fluidly coupled to the first cold finger, the second cryocooler fluidly coupled to the second cold finger; and
flexing the second cold finger at a flexure region disposed at the end portion of the second cold finger.

19. The method of claim 18, wherein the platform has a different coefficient of thermal expansion than any of the cold fingers.

20. The method of claim 18, wherein the flexure region comprises at least one of:
    openings that pass through the second cold finger; and
    a blade that is narrower in one dimension than in another dimension.

* * * * *